July 10, 1923.
B. A. DANIELS
PROTECTIVE VENTILATING SCREEN FOR VEHICLES
Filed May 31, 1922 2 Sheets-Sheet 1
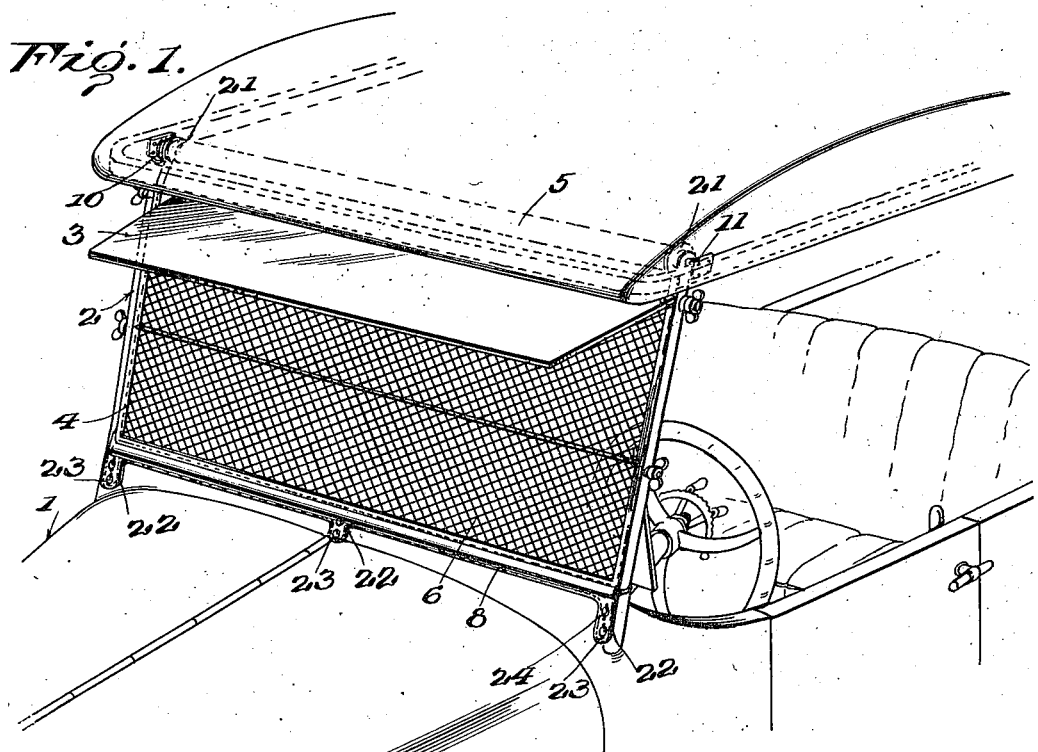
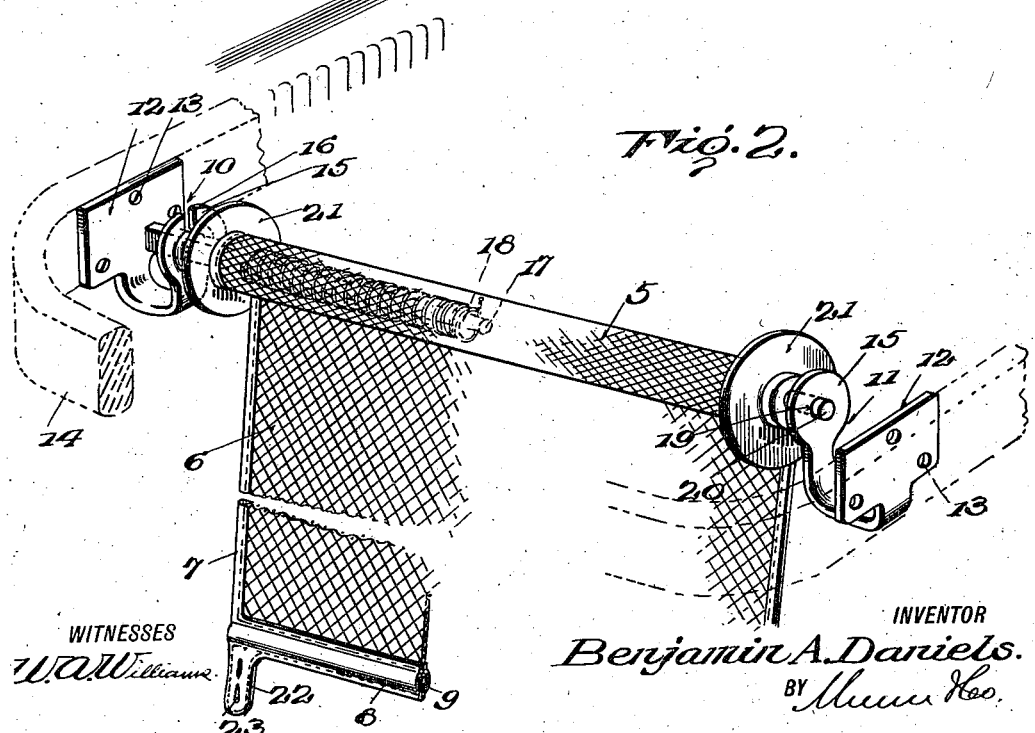
INVENTOR
Benjamin A. Daniels.
BY
ATTORNEYS

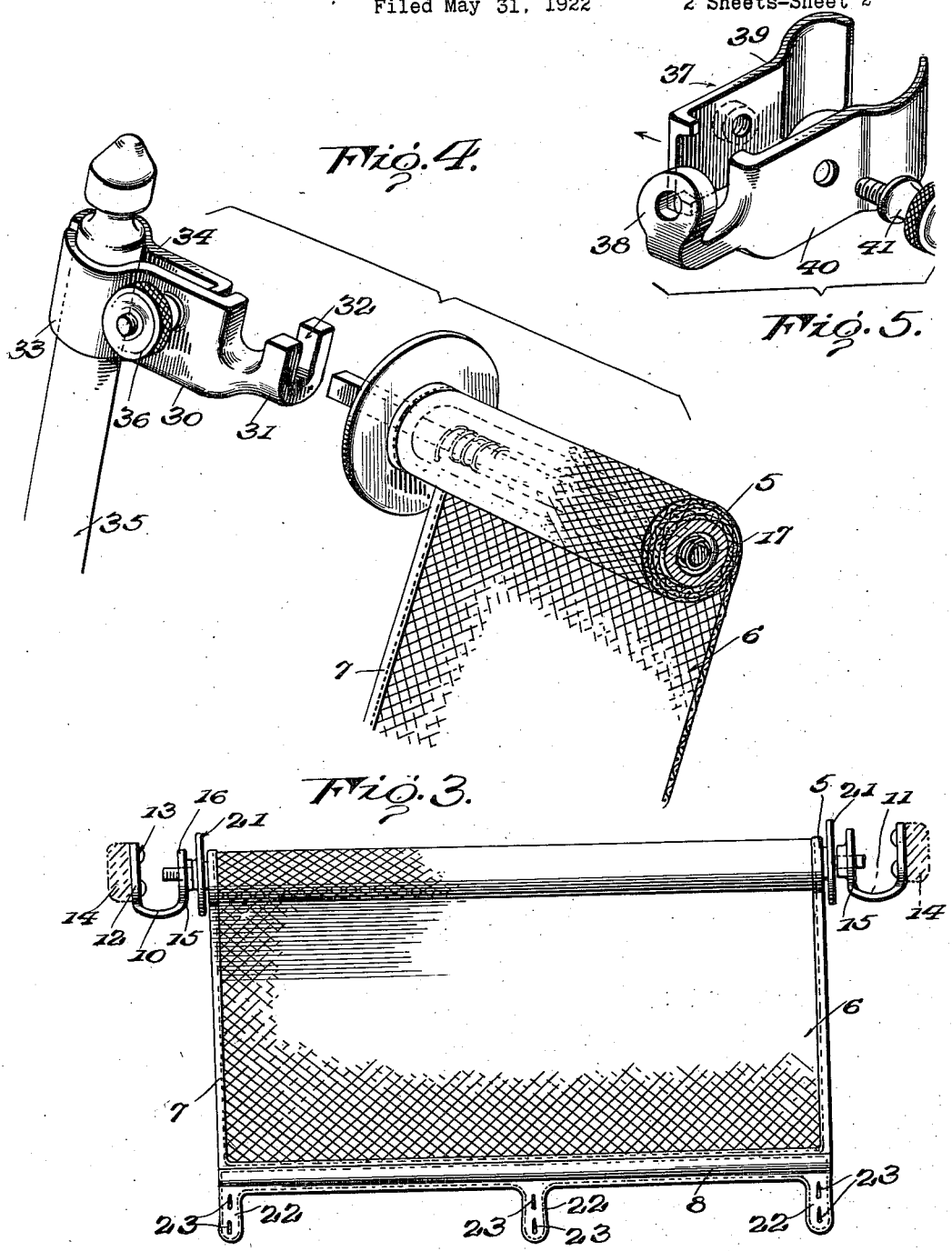

Patented July 10, 1923.

1,461,478

UNITED STATES PATENT OFFICE.

BENJAMIN A. DANIELS, OF TAMPA, FLORIDA.

PROTECTIVE VENTILATING SCREEN FOR VEHICLES.

Application filed May 31, 1922. Serial No. 564,696.

*To all whom it may concern:*

Be it known that I, BENJAMIN A. DANIELS, a citizen of the United States, and resident of Tampa, in the county of Hillsborough and State of Florida, have invented certain new and useful Improvements in Protective Ventilating Screens for Vehicles, of which the following is a specification.

My invention is a protective ventilating screen for automobiles and other vehicles, and it consists in the combinations, constructions and arrangements herein described and claimed.

An object of my invention is to provide a simple, economical and practical device which is adapted to be detachably secured to a vehicle in position to protect occupants of the vehicle and the interior parts of the vehicle from insects, missiles, and other flying objects, such as gravel, stone, dust and the like which would otherwise enter the vehicle through an aperture in the walls thereof or parts appurtenant thereto.

A further object of my invention is to provide a device of the character described which in its applied position on a vehicle will not obscure the vision of the occupants of the vehicle or in any way interfere with the operation of the vehicle in the usual manner.

A further object of my invention is to provide a device of the character described which will protect the occupants of a vehicle to which applied from the force of the wind when traveling at a high speed.

A still further object of my invention is to provide an attachment of the character described which will not be visible from the exterior of a vehicle to which applied when in inactive position, which can be detached readily and stored in a small space when not in use, and which when operatively applied does not detract from but rather enhances the appearance of an automobile or other vehicle.

Other objects and advantages will be apparent from the following description, and the novel features of the invention will be particularly outlined in the appended claim.

My invention is illustrated in the accompanying drawings, forming a part of this application, in which—

Figure 1 is a perspective view showing a practical embodiment of the invention operatively applied to the front portion of an automobile, Figure 2 is an enlarged fragmentary perspective view, showing the practical embodiment of the invention and supports therefor, Figure 3 is a front elevation of the structure exhibited in Figure 2, Figure 4 is a fragmentary perspective group view of an embodiment of the invention including one of a pair of bracket members novel over those exhibited in the preceding views, and a support to which the bracket is secured, and Figure 5 is a perspective view of a bracket adapted to cooperate with the bracket shown in Fig. 3.

Referring now to the drawings, I show in Figure 1 a portion of an automobile 1 which is provided with a wind shield 2 including upper and lower transparent portions 3 and 4 respectively, the upper portion 3 being shown as supported for movement about a horizontal axis relatively to the lower portion 4, as is ordinary. When the upper portion 3 of the windshield is in raised position in respect to the lower portion 4, objects, such as dust, ground gravel, stones and the like frequently enter the automobile between the upper portion 3 and the lower portion 4 and injure or inconvenience the operator or other occupants of the automobile or damage the clothing of the occupants of the automobile or the interior part of the latter. Moreover, the driver and other occupants of the vehicle are subjected to the force of the wind or air currents which are considerable when the vehicle is moving at a relatively high speed. To overcome the objectionable features which have just been enumerated and to obtain other advantages, which will hereinafter appear, I provide a protective ventilating screen for protecting occupants of automobiles or other vehicles from flying objects, the force of the wind, and missiles which may be projected through an opening in the windshield or in other parts of the vehicle. In carrying my invention into effect, I make use of a roller 5 which is of the spring-actuated type of construction such as ordinarily used to support window shades and the like. A shield or screen 6 made of any suitable foraminated metallic material, which is sufficiently pliable, strong and durable for the service for which intended, such as a fine thread coarse mesh wire gauze, is secured along one edge to the roller 5 in any suitable known or preferred manner. In the embodiment of the invention shown, the shield or screen 6 is substantially rectangular and is secured along the upper edge thereof to the roller 5. The side and lower edges of the screen are preferably, although not necessarily, bound with tape, or the like, as indicated at 7 to prevent fraying or raveling out of the material of which the shield or screen is made. The binding along the lower edge of the shield or screen is preferably formed to provide a sleeve portion 8 in which is disposed a stiffener 9, which is shown as being a metallic rod.

In the application of the embodiment of the invention illustrated in Figures 1 to 3 inclusive, to an automobile in position to protect occupants of the car from objects flying through an opening in the windshield, a pair of brackets 10 and 11 respectively are employed. Each of these brackets is substantially of U-shape and includes a securing portion 12 adapted to be attached by screws 13 or the like to a frame member 14 of the top of the automobile, at opposite sides and above the windshield frame. The brackets 10 and 11 also include arms or ears 15 which are substantially parallel with the securing portions 12 and are disposed in confronting relation in respect to each other when the brackets 10 and 11 are secured to the bow or frame member 14 at opposite sides of the windshield frame, in the manner described. The arm or ear 15 of the bracket 10 is provided with a slot 16 extending thereinto from the upper side thereof and being adapted to engage a non-circular portion of an axial stud or shaft 17 which extends from one end of the roller 5 and which is secured to a spring 18 which is positioned within the bore of the roller. The arm 15 of the bracket 11 is provided with an opening 19 therethrough in which is journaled a portion of a stud 20 which extends from the other end of the roller 5 in axial alignment with the stud or shaft 17. Washers 21 of fibre or other relatively soft material are placed upon the studs 17 and 19 between the ends of the rollers and the arms or ears of the brackets 10 and 11 to obviate any appreciable noise when the roller is rotating.

The sleeve portion 8 is provided with a plurality of depending fastening tabs 22 having openings or eyelets 23 for engaging hooks or studs 24 attached to the body of the automobile, whereby the shield or screen 6 may be releasably secured in extended position, as illustrated in Figure 1.

From the foregoing description of the various parts of the device, the operation thereof may be readily understood. When the windshield section or portion 3 is open, the shield or screen 6 is grasped and a sufficient length thereof is unwound from the roller 5 to protect the occupants of the vehicle and the interior parts of the vehicle against the entrance of dust, flying objects, insects, or the like through the windshield opening. The metallic screen 6 is painted or otherwise colored a light gray to prevent glare from the headlight of an approaching vehicle. When the windshield is closed, the screen 6 is wound upon the roller 5 in the usual manner, the roller being spring-actuated as heretofore stated. The device in its inactive position takes up but little space and may be readily detached from the brackets 10 and 11 and conveniently stored or carried. When the device is in inactive applied position, as described, it is not visible to an observer outside of the automobile.

While I have shown in the accompaanying drawings an embodiment of the invention operatively applied to an automobile in a desired relation to the windshield thereof, it will be understood that I may position embodiments of the invention in front of the respective seats of an automobile or other vehicle and in position to protect occupant of a vehicle from objects entering the vehicle through various apertures and openings in the walls thereof or in parts thereof, such as windows, doorways or the like, without departing from the spirit and scope of the invention. Moreover, the roller embodied in my invention may be supported upon supports other than the bow or frame member of an automobile top. In Figures 4 and 5, I show brackets for supporting the roller 5 upon upright rod-like members, such as the vertical frame members or posts of a windshield frame or the like. In Figure 4, a bracket 30 includes a portion 31 having a slot 32 therein adapted to be engaged with the non-circular end portion of the stud or shaft 17. The bracket 30 also includes a securing portion in the form of a clamp comprising complemental members 33 and 34 adapted to embrace a rod-like support 35 and being adjustably and releasably secured together by means of a thumb screw 36 or the like.

In Figure 5, I show a bracket 37 which is adapted to cooperate with the bracket 30 and with a portion 38 adapted to serve as a bearing for the stud 20. The bracket 37 also comprises a securing portion in the form of clamps consisting of complementary members 39 and 40 adapted to embrace a support, such as that indicated at 35 in Figure 4. The thumb screw 41 provides a means for detachably and adjustably securing the clamps 40 and 39 together.

The operation of the embodiment of the invention including the brackets 30 and 37 in lieu of the brackets 10 and 11 is identical in essential respects with the operation heretofore described and a description thereof is therefore deemed unnecessary herein.

The shield or screen comprised in an embodiment of my invention, as described, prevents the entrance of flying objects into a vehicle to which applied and protects the occupants of a vehicle from the force of wind or air currents moving at high velocity but does not in any way obscure the vision of the occupants of the vehicle or detrimentally affect the ventilation of the vehicle. In fact, the device provides a means for admitting air to the interior of a vehicle for the purpose of ventilation and at the same time protects the interior parts of the vehicle and the occupants thereof.

Obviously, my invention is susceptible of embodiment in forms other than those illustrated in the accompanying drawings, and I therefore consider as my own all modifications of the forms of the device disclosed herein, which fairly fall within the scope of the appended claim.

Having thus described the invention, what I claim is:—

In combination, a spring roller, a protective ventilating screen of substantially rectangular configuration and being made of a foraminated flexible metallic material, said screen being secured along its upper edge to the spring roller, a fabric binding the side and lower edges of the screen, said binding along the lower edge of the screen being fashioned to provide a sleeve extending transversely of the screen, a stiffening rod disposed in the sleeve, and brackets engageable with the top bow of an automobile for pivotally supporting the roller at its ends in transverse relation to the wind shield, said binding at the lower edge of the screen having spaced apart depending tab portions provided with eyelets for engaging hooks or the like at the lower end of the windshield frame to releasably hold the screen in extended position.

BENJAMIN A. DANIELS.